United States Patent [19] [11] 4,044,900
Gaumont et al. [45] Aug. 30, 1977

[54] AUTOMOBILE TOWING DEVICE

[75] Inventors: Richard J. Gaumont; Maurice Leonard Wolfe, both of Los Angeles; Robert Lee Collins, Culver City, all of Calif.

[73] Assignee: West Manufacturing & Towing Equipment Inc., Los Angeles, Calif.

[21] Appl. No.: 745,610

[22] Filed: Nov. 26, 1976

Related U.S. Application Data

[63] Continuation-in-part of Ser. No. 631,669, Nov. 13, 1975, abandoned.

[51] Int. Cl.² ............................................. B60P 3/12
[52] U.S. Cl. ..................................... 214/86 A; 92/19
[58] Field of Search ............... 214/86 A; 254/139.1; 187/8.5; 92/18, 19, 23, 24, 25; 212/39

[56] References Cited

U.S. PATENT DOCUMENTS

| 2,896,583 | 7/1959 | Stixrood | 92/19 |
| 3,502,228 | 3/1970 | Tamborino | 212/39 R |
| 3,838,783 | 10/1974 | Tune | 187/8.5 X |

Primary Examiner—Albert J. Makay
Attorney, Agent, or Firm—Edward A. Sokolski

[57] ABSTRACT

A boom for lifting and supporting a vehicle to be towed is pivotally supported at one end thereof on the bed of the towing truck. A hydraulic cylinder is pivotally supported on the truck and has its ram pivotally attached to the boom. Also pivotally attached to the boom is a bracing post which is slidably fitted into a support member, which is pivotally mounted on the truck. A ratcheting lock mechanism is mounted on the support member for locking the bracing post relative thereto when the boom has been driven to the towing position. The ratcheting mechanism permits upward travel of the boom but prevents downward travel from any one of several locking positions except upon manual release thereof.

5 Claims, 8 Drawing Figures

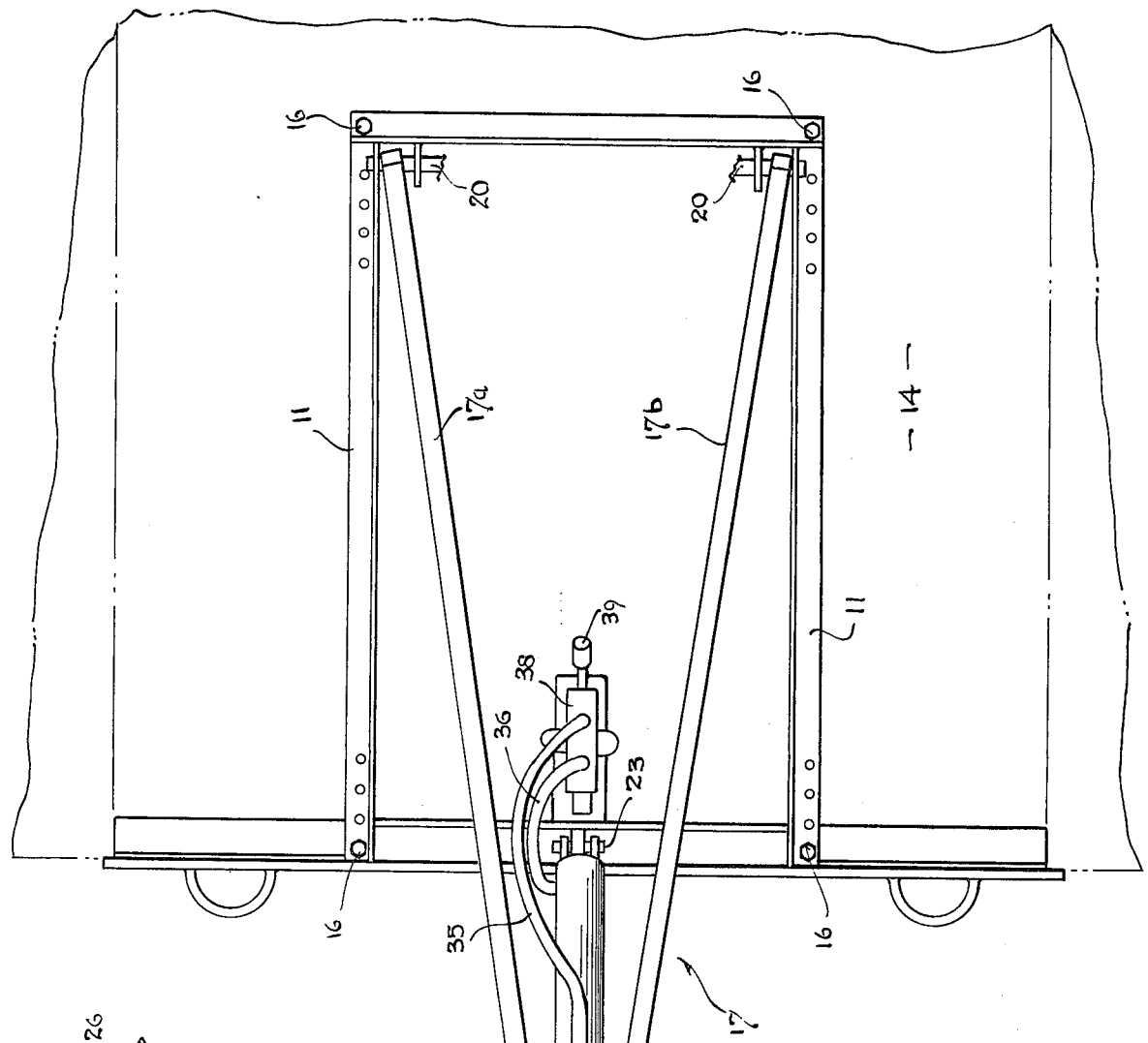
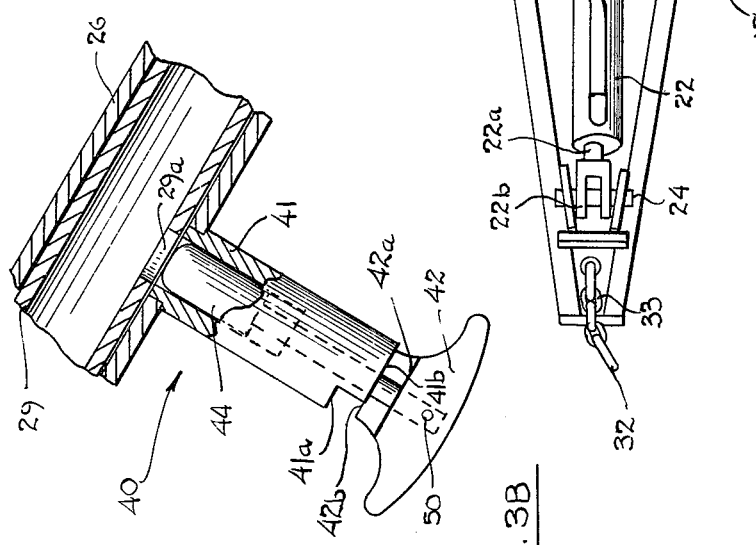
FIG. 2
FIG. 3B

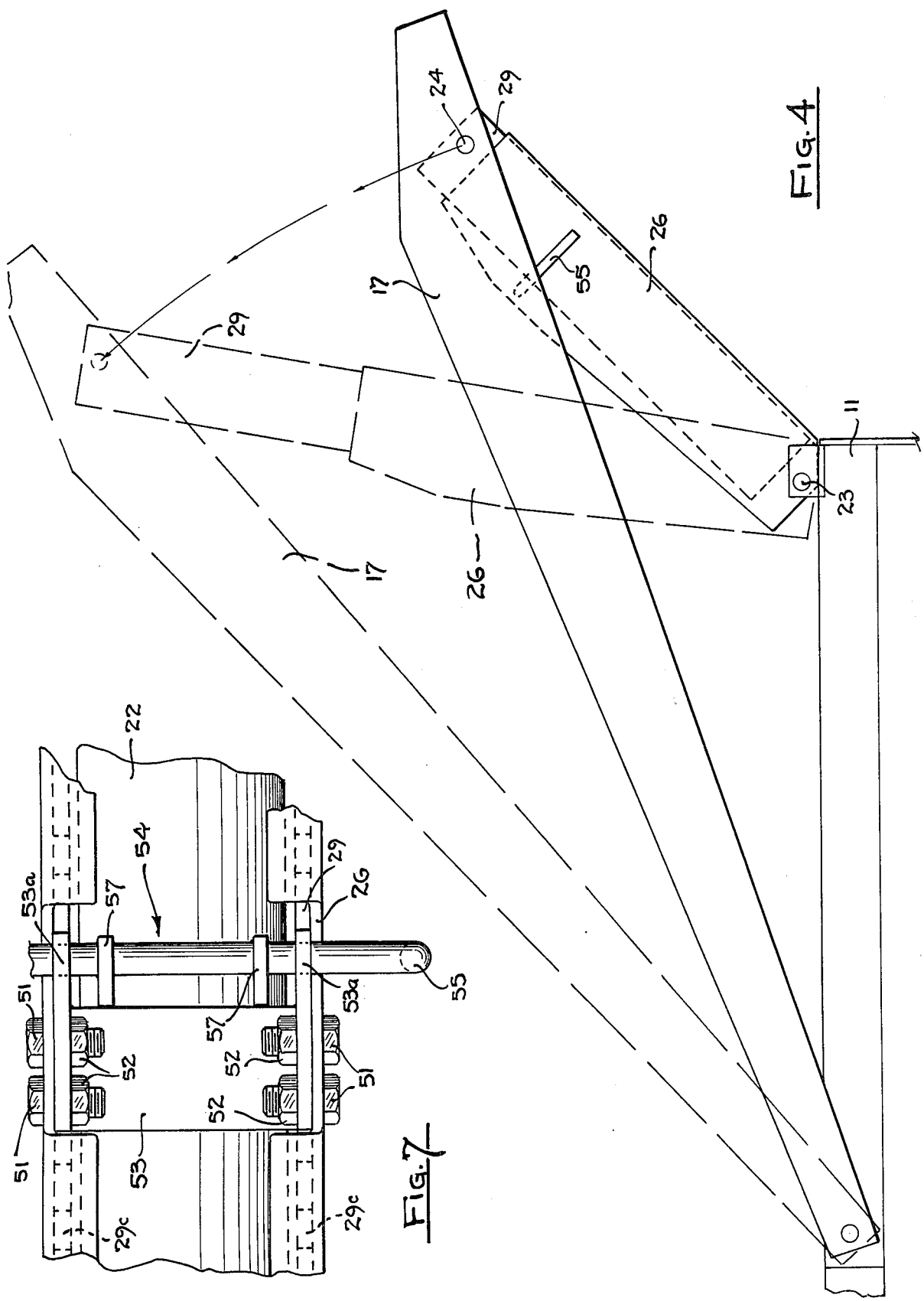

AUTOMOBILE TOWING DEVICE

This application is a continuation in part of our application Ser. No. 631,669, filed Nov. 13, 1975, now abandoned.

This invention relates to automobile towing devices, and more particularly to such a device which utilizes a pivotally mounted hydraulic boom and a ratcheting brace device for locking the boom in the towing position.

In many automobile towing devices, the support of the boom is left solely to the hydraulic ram used for its raising and lowering. Thus, in the event that the hydraulic mechanism should fail, the boom will lose its support which could cause damage to the vehicle being towed and the tow truck, and injury to personnel. The device of the present invention obviates this problem by providing means for locking the boom in its towing position by means of a brace mechanism which is not dependent on the functioning of the hydraulic drive. This brace mechanism is simple and reliable in its operation and construction, and permits upward movement of the boom but automatically locks the boom against downward movement at each of several ratcheting positions. Further, the device of the present invention is simple and economical in construction, involving a minimum number of parts, so that it is considerably lighter in weight and substantially more economical to fabricate than most prior art towing devices. Further, the device of the invention can be easily installed on the bed of a pick-up truck and can be operated from the power steering pump of a conventional vehicle power steering system.

It is therefore an object of this invention to improve the safety of automobile towing devices.

It is a further object of this invention to provide an automobile towing device which is simpler and more economical in its construction than devices of the prior art.

Other objects of the invention will become apparent as the description proceeds in connection with the accompanying drawings, of which:

FIG. 2 is a top plan view of the first embodiment;

FIG. 3A is a sectional view illustrating the ratcheting lock mechanism of the first embodiment in the locked position;

FIG. 3B is a sectional view of the ratcheting lock mechanism of the first embodiment in the unlocked position;

FIG. 4 is a side elevational view of the drive and lock mechanism of a second embodiment of the invention;

FIG. 7 is a view taken along the plane indicated by 7—7 in FIG. 5.

Briefly described, the device of the invention is as follows: A boom is pivotally supported on a base frame which is fixedly attached to the bed of a tow truck. A hydraulic cylinder is pivotally supported on the frame and has its ram pivotally attached to the boom. Also pivotally attached to the boom is a bracing post which is adjustably fitted into a support member, this member being pivotally supported on the base frame. A locking member is mounted on the support member and has a ratchet pawl which fits into any one of a series of spaced openings formed along the wall of the bracing post, the pawl locking the bracing post to the support member at any one of these positions. As the hydraulic ram drives the boom upwardly on its pivotal mounts, the ratchet pawl operates to successively engage the openings in the bracing post, permitting upward movement from each of these positions but preventing downward movement below each position once it is reached. Once the boom has been raised to the desired towing position, the ratchet pawl automatically locks the bracing post to the support member, thereby providing support for the boom independent of the hydraulic drive.

Figure 1:
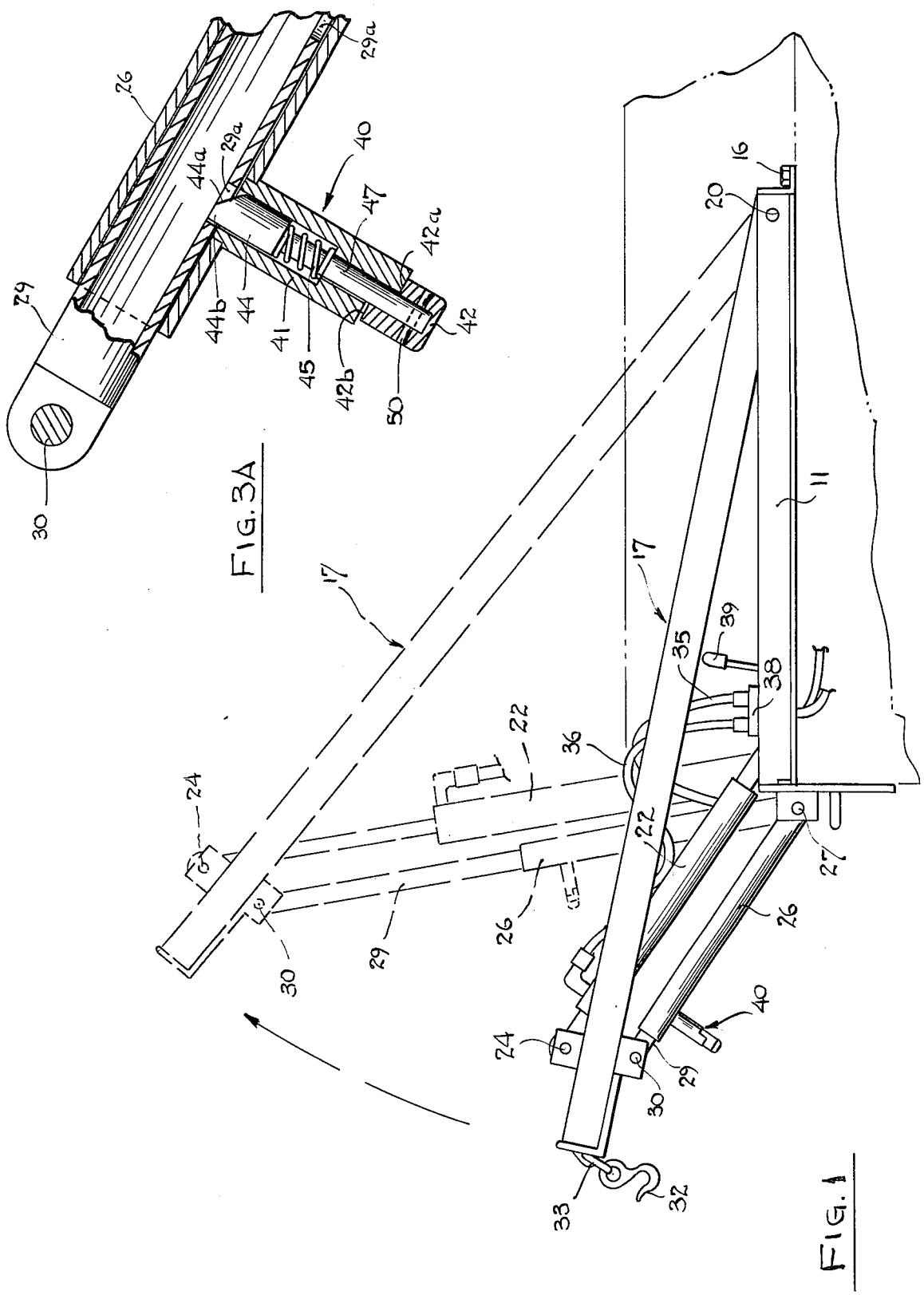
FIG. 1 is a side elevational view of a first embodiment of the invention.
Figures 5, 6:
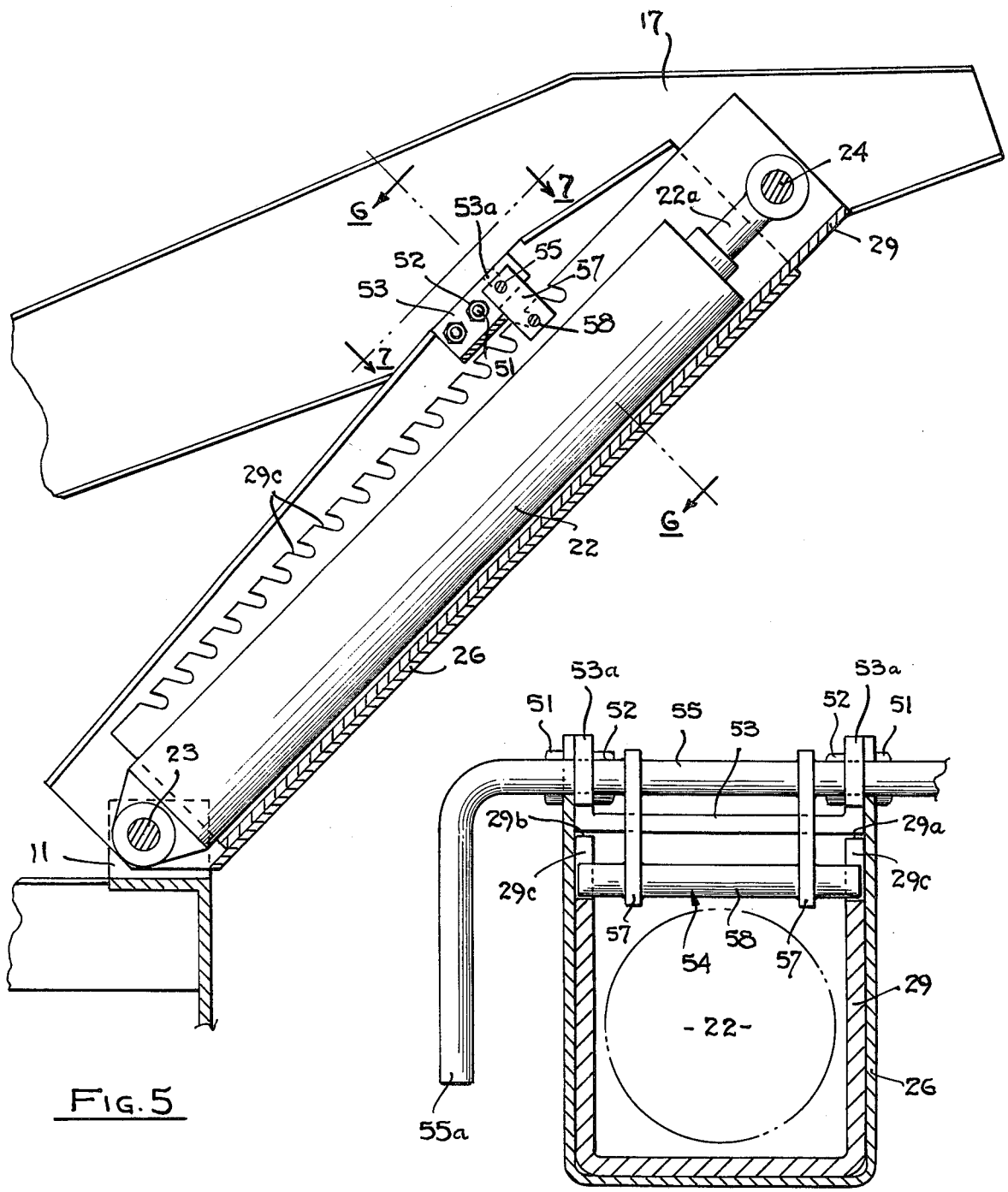
FIG. 5 is a sectional view of the mechanism of FIG. 4.
FIG. 6 is a sectional view taken along the plane indicated by 6—6 in FIG. 5.

Referring now to FIGS. 1 and 2, base frame 11 is fixedly attached to the bed of truck 14 by means of bolts 16. Boom 17 is formed from a pair of arms 17a and 17b joined together at one end thereof to form a triangle. The opposite ends of arms 17a are pivotally supported on frame 11 by means of trunnions 20 which are fixedly attached to the frame.

Hydraulic cylinder 22 is pivotally supported on frame 11 by means of trunnion 23 which is fixedly attached to the frame. The ram 22a of cylinder 22 is pivotally attached to boom 17 by means of coupler 22b which is pivotally connected to trunnion 24. Trunnion 24 is fixedly attached to boom 17. Support member 26 is pivotally supported on frame 11 by means of trunnion 27, which is fixedly attached to the frame. Bracing post 29 which is hollow is telescopically fitted within tubular support member 26 and is pivotally attached at one end thereof to boom 17 by means of trunnion 30 which is fixedly attached to the boom. A hook 32 is connected to the end of boom 17 by means of chain 33. Hydraulic drive is provided to cylinder 22 by means of hydraulic lines 35 and 36 which receive hydraulic fluid through hydraulic control 38, which is operated by means of handle 39. The hydraulic drive power may be provided to control 38 from the vehicle's normal power steering mechanism, the connections to this mechanism being relatively easy to make.

Referring now additionally to FIGS. 3A and 3B, the ratcheting lock mechanism for locking bracing post in position is shown. This mechanism is shown in the locked position in FIG. 3A and in the unlocked position in FIG. 3B, the handle 42 of the mechanism being turned 90° in FIG. 3B from the position shown in FIG. 3A. This mechanism comprises a sleeve portion 41 which is fixedly attached to the wall of tube 26. Slidably mounted in sleeve 41 is pawl member 44 which is urged inwardly towards tube 26 by means of spring 45 which is mounted within sleeve 41 and abuts at one end against the pawl and at the other against the wall of the sleeve. Fixedly attached to locking pawl 44 is shaft 47, handle 42 being attached to the shaft by means of pin 50. Handle 42 is undercut on one side thereof to form a step 42a. The other side 42b of the handle thus extends substantially further than step portion 42a. A similar step 41a is formed on one side of sleeve 41. Hollow bracing post 29 has a plurality of apertures 29a spaced along the longitudinal extent thereof (only two shown in FIG. 3A for convenience of illustration). Locking pawl 44 enters each of apertures 29a, as shown for example in FIG. 3A, as the boom is raised. As long as bracing post 29 is moving upwardly, locking pawl 44 will be driven out of each aperture 29a with such upward motion by virtue of the abutment of canted surface 44a of the pawl against the aperture wall. Downward motion of bracing post 29 will be prevented with the pawl in any one of apertures 29a by virtue of the abutment of the straight side 44b of the pawl against the aperture wall.

As can be seen in FIG. 1, the boom is driven upwardly to the dotted line position as the ram of the hydraulic cylinder is extended, with the bracing post being drawn out of its support tube. With the boom in the desired towing position, locking pawl 44 is retained within one of apertures 29a, to lock the bracing post to the support tube, thereby bracing the boom. When the boom is to be lowered, handle 42 is pulled out to withdraw pawl 44 from aperture 29a as shown in FIG. 3B, handle 42 then being rotated 90° so that its extended surface 42b abuts against the extended surface 41b of the sleeve, rather than the undercut surface 41a thereof, as before. Thus, the pawl is retained in the withdrawn position to permit free downward movement of the boom in response to the hydraulic drive.

Referring now to FIGS. 4-7, the hydraulic drive and ratcheting lock mechanism of a second embodiment of the invention is illustrated. This second embodiment utilizes the same boom structure as the first, but employs a somewhat different structure for the ratcheting lock mechanism than the first embodiment. In the second embodiment, the hydralic drive and the ratcheting lock mechanism are integrated together to form a more compact structural configuration.

Hydraulic cylinder 22 is pivotally supported on base frame 11 (fixedly attached to the truck) by means of trunnion 23, which is fixedly attached to the frame. Also pivotally supported on the frame by means of trunion 23 is support member 26 which is U-shaped in configuration. Contained within support member 26 in slidable relationship therewith is bracing post 29. One end of bracing post 29 and the end of ram 22a of cylinder 22 are pivotally attached to boom 17 by means of trunnion 24 which is fixedly attached to the boom and pivotally attached to the bracing post and ram. Cylinder 22 is contained within U-shaped bracing post 29, the bracing post in turn being contained within support member 26. Formed in uniformly spaced relationship along the opposite edges 29a and 29b of bracing post 29 are a plurality of slots or openings 29c which form ratchet teeth for the ratcheting mechanism.

Fixedly attached to support member 26 by means of bolts 51 and nuts 52 is U-shaped bracket 53 which functions to support the ratchet pawl mechanism 54 and to limit the downward travel of this mechanism. Ratchet pawl mechanism includes lever bar 55 which is pivotally supported in slots 53a formed in the bracket. Lever bar 55 has a handle 55a formed by a bent-over portion thereof to enable manual rotation of the lever. Fixedly attached to lever bar 55 by means of brackets 57 is ratchet pawl 58. Lever 55 and pawl 58 may be attached to brackets 57 by welding.

When the hydraulic ram 22a is actuated, bracing post 29, support member 26 and the boom structure are driven as shown in FIG. 4 from the solid line to the dotted line positions. With such upward drive, ratchet pawl 58 slides along edges 29a and 29b from ratchet slot to ratchet slot with lever bar 55 being pivotally moved back and forth during this operation. When the ram is stopped in any position, pawl 58 engages the ratchet teeth at this position and locks bracing post 29 and the boom, it being impossible for the post to move downwardly while the pawl is engaged in any one of slots 29c. Thus, the desired locking action is provided as in the previous embodiment. When the boom is to be driven downwardly, handle 55a is manually actuated to draw pawl 58 out of the pair of slots 29c in which it is engaged, thereby permitting the post and boom to be moved downwardly when the position is actuated to cause such motion.

The device of the invention thus provides a simple and economical yet highly efficient towing device which has an effective safety mechanism incorporated therein to guard against possible failure of the hydraulic drive.

While the invention has been described and illustrated in detail, it is to be clearly understood that this is intended by way of illustration and example only, and is not to be taken by way of limitation, the spirit and scope of this invention being limited only by the terms of the following claims.

We claim:

1. In an automobile towing device for towing a vehicle with a tow truck having a boom for lifting and supporting the vehicle and a hydraulic cylinder for driving the boom pivotally upwardly and downwardly wherein the improvement comprises:
    a hollow support member,
    a hollow bracing post slidably mounted within said support member, said cylinder being mounted within said bracing post,
    means for pivotally supporting said cylinder and said support member on said tow truck,
    means for pivotally attaching the ram of said cylinder and said bracing post to said boom for pivotal motion about a common pivot axis,
    said bracing post being U-shaped and having a plurality of paired canted slots formed along the edges of the opposing walls thereof, and
    pawl mechanism means pivotally mounted on said support member for successively engaging the bracing post in pairs of said slots as said bracing post is driven upwardly along the support member, thereby to prevent downward motion of said bracing post when the bracing post is stopped with the pawl mechanism means engaged in a pair of said slots.

2. The device of claim 1 wherein said pawl mechanism means includes a lever pivotally supported on the support member, a bar forming a pawl which engages in said slots, and bracket means for fixedly suspending the pawl bar from the lever, said lever having a handle for use in pivotally rotating the lever and the pawl bar to draw the pawl bar out of the slots to permit downward movement of the bracing post.

3. The device of claim 1 wherein said means for pivotally supporting said cylinder and said support member on said truck comprises a base frame fixedly attached to said truck and trunnion means fixedly attached to said base frame to which the cylinder and support member are pivotally connected.

4. The device of claim 3 wherein said hydraulic cylinder is pivotally supported on said base frame, said cylinder having a ram pivotally attached to the boom.

5. The device of claim 4 wherein the ram of said cylinder and said bracing post are pivotally attached to said boom for movement about a common pivot axis.

* * * * *